United States Patent
Damo et al.

(10) Patent No.: US 12,468,714 B2
(45) Date of Patent: Nov. 11, 2025

(54) SELF-LEARNING ANALYTICAL SOLUTION CORE

(71) Applicant: HITACHI VANTARA LLC, Santa Clara, CA (US)

(72) Inventors: Mauro A. Damo, Windermere, FL (US); Wei Lin, Plainsboro, NJ (US); William Schmarzo, Palo Alto, CA (US)

(73) Assignee: Hitachi Vantara LLC, Santa Clara, CA (US)

( * ) Notice: Subject to any disclaimer, the term of this patent is extended or adjusted under 35 U.S.C. 154(b) by 378 days.

(21) Appl. No.: 18/266,178

(22) PCT Filed: Dec. 21, 2020

(86) PCT No.: PCT/US2020/066387
§ 371 (c)(1),
(2) Date: Jun. 8, 2023

(87) PCT Pub. No.: WO2022/139789
PCT Pub. Date: Jun. 30, 2022

(65) Prior Publication Data
US 2024/0046041 A1 Feb. 8, 2024

(51) Int. Cl.
*G06F 16/2457* (2019.01)

(52) U.S. Cl.
CPC .............. *G06F 16/24575* (2019.01)

(58) Field of Classification Search
CPC ...... G06F 16/21; G06F 16/2457; G06F 16/27; G06F 16/28; G06F 40/30; G06F 8/36; G06F 8/71; G06F 9/445; G06F 9/48; G06F 9/50; G06F 8/41; G06F 15/78; G06F 12/10; G06F 13/16; G06F 15/82; G06F 17/16; G06F 11/30; G06F 11/34; G06F 12/02;
(Continued)

(56) References Cited

U.S. PATENT DOCUMENTS

2017/0102678 A1 4/2017 Nixon et al.
2017/0201413 A1 7/2017 Marinelli et al.
(Continued)

OTHER PUBLICATIONS

U.S. Patent & Trademark Office/Patent Cooperation Treaty. PCT International Search Report and Written Opinion Mailed Mar. 12, 2021. International Application No. PCT/US2020/066387. Name of Applicant: Hitachi Vantara LLC. English Language. 7 pages.
(Continued)

*Primary Examiner* — Rayeez R Chowdhury
(74) *Attorney, Agent, or Firm* — PROCOPIO, CORY, HARGREAVES & SAVITCH LLP

(57) ABSTRACT

Example implementations described herein are directed to a system with a plurality of sensors associated with a plurality of apparatuses, which involves, for receipt of a hypothesis canvas and meta-data from the plurality of sensors, generating a plurality of meta-pipeline stages, the plurality of meta-pipeline stages having the meta-data and one or more stages, each of the one or more stages being an analytics application or a machine learning application stacked in execution order based on the meta-data and the hypothesis canvas; and executing the plurality of meta-pipeline stages in execution order on the meta-data to generate an analytics model for the system.

16 Claims, 13 Drawing Sheets

(58) Field of Classification Search
CPC ............ G06F 12/0842; G06F 12/1009; G06F 12/1036; G06F 13/00; G06F 13/28; G06F 15/173; G06F 15/80; G06F 18/214; G06F 18/2411; G06F 3/06; G06F 7/544; G06F 9/38; G06F 9/448
See application file for complete search history.

(56) References Cited

U.S. PATENT DOCUMENTS

| | | | |
|---|---|---|---|
| 2018/0025157 A1* | 1/2018 | Titonis | H04W 12/128 726/22 |
| 2018/0165604 A1* | 6/2018 | Minkin | G06Q 10/06 |
| 2018/0329644 A1* | 11/2018 | Das | G06F 3/0604 |

OTHER PUBLICATIONS

Edge et al. "Beyond Tasks: Activity Typology for Visual Analytics", IEE, Jan. 2018, Retrieved: May 24, 2023. URL: https://ieeexplore.ieee.org/stamp/stamp.jsp?tp=&amumber=8019880. English Language.

Schmarzo, William. "Using Hypothesis Development Canvas to Predict Golden State Warriors Victories". Data Science Central | A Community for AI Practitioners. DataScienceCentral.com. Retrieved: May 24, 2023. URL: https://www.datasciencecentral.com/using-hypothesis-development-canvas-to-predict-golden-state/. English Language. 9 pages.

* cited by examiner

| Potential Use Cases 405 | Model Description 401 | Model Metrics / KPIs 408 |
|---|---|---|
| Detection anomalies and location identification on asst in rides, trains and trams for help technical staff in troubleshooting process | Continuous monitoring and location of assets with normal and abnormal behavior in a topology network | Detection of abnormal signal on zones on rail tracks |
| Variables / Data Sources (Inputs) 406<br>• Realtime streaming data from sensors<br>• Realtime streaming data from alert systems | Algorithm Libraries (Processing) 402<br>pyspark    Pandas==1.1.2<br>Numpy==1.15.4    Scikit-learn==1.5.2<br>Scipy==1.5.2    Mlflow==1.7.0<br>Datetime    Hadoop==3.x<br>Matplotlib==3.2.2    Hive<br>Re=2.2.1    Geopandas==0.8.1<br>papermill    Opencv==4.4.0 | API (Outputs) 409<br>Fingerprint detection of abnormal behavior based on normal behavior<br>Geographic map showing for each asset what is the normal and abnormal behavior |
| Feature Engineering Requirements 407<br>z_ scalar normalization<br>Average and Standard Deviation Computation<br>Time windows for signals computation and z-score calculation<br>Pearson's Correlation of signals by asset and time<br>Graphic representation of anomaly by asset | Software and Hardware Technology Requirements 403<br>• Linux 7.X    • Single server with RAM and storage memory<br>• Spark==3.0.0    • Cluster of servers with 100TB of storage<br>• Python==3.8    1TB of RAM and 300 Cores | Operational Comments 410<br>• Time series signal isolation in normal and abnormal fingerprint<br>• Distribution of normal and abnormal of signals during an uptime and downtime<br>• Correlation of signals to capture abnormal and normal signals robustness<br>• Z-score computation for anomaly detection<br>• Create a graphic representation of the assets for visual monitoring |
| | Licensing Variables 404<br>PSF license agreement<br>BSD 3-clause | |

FIG. 4

Hypothesis: Continuous Anomaly Monitoring and location for Assets in Motion    Completed by: Jon Doe    Date: 10/10/10    Iteration: 01

Business Value 503
- Improve operational effectiveness (uptime)
- Increase maintenance equipment utilization
- Improve operating safety Hypothesis 501
Improve technician troubleshooting efficiency reducing the time of root cause analysis of the failure KPI's 502
Machinery uptime, maintenance labor cost, mean time to triage and mean time to repair Impediments 511
- Data Volume
- Low rate of failures Decisions 506
- Staffing
- Hiring
- Training
- Consumables management
- Resource schedule management Entities 505
- Technicians
- Operators
- Engineers
- Operations Supervisors
- Operation Manager Stakeholders 504
- Maintenance
- Engineering Risks (FP/FN) 512
- Customer Risks due to delayed deliveries or quality
- Manufacturing Risks due to worker safety and efficiency
- Financial Risks due to poor production execution Predictions 507
- Detection of each assets or group of assets could represent a failure in the ride

| Data Sources 508 | Value | Data Sources 508 | Value |
|---|---|---|---|
| Machine Sensors | 4 | Sensors History | 4 |
| Alerts Systems | 4 | Alert History | 4 |
| Maintenance Systems | 4 | Maintenance History | 4 |

Variables (Dimensions) 509
- Alert Logs
- Signal logs
- Engineering Reports
- Time series data Recommendations 510
- Infer the best root cause analysis could be that cause the troubleshooting Financial Assessment 513

| Operator Costs | Uptime | Worker Safety |
|---|---|---|
| 4 | 4 | 2 |

| Product Quality | Operation Quality | Employee Sat |
|---|---|---|
| 3 | 4 | 3 |

Impediments Assessment 514

| DataOps | Analytic Skills | Ops Mgmt |
|---|---|---|
| 3 | 3 | 3 |

| Infrastructure | Budget | Staffing |
|---|---|---|
| 4 | 2 | 4 |

FIG. 5

SELF-LEARNING ANALYTICAL SOLUTION CORE

BACKGROUND

Field

The present disclosure is directed to data analytics platforms, and more specifically, to systems and methods to facilitate a self-learning analytical solution core.

Related Art

In the related art, creating a model is a challenging problem for data analytics, in part due to resource gaps. Data scientists and subject matter experts are increasingly rare positions in companies.

In the related art, there is a problem for facilitating systems that learn from previous training models. During a typical data science process, the data scientist tries several kinds of models with multiple hyperparameters. This process demands a significant amount of time from the data science team and in the end, the data scientists keep only a small number of the models created. All the learning from these models that did not work become discarded, even though it could potentially be useful when building models later. Because the history of the models is not kept, it is not possible to identify what could work on future analysis.

In the related art, one of the challenges in analytics is creating models using the business requirements. The process of understanding the business problem, transforming it into a hypothesis test, and applying the appropriate pipeline is complex because of the infinite possibilities of stages. A stage is one sequential step of an analytical pipeline, in a machine learning pipeline.

In the related art, there is a problem in learning lessons from previous feature engineering experiments. A data scientist invests a significant amount of time preparing the data. All the lessons learned from feature engineering and feature selection are wasted because this learning is not stored. Keeping these meta-feature lessons can be important to use in future models.

SUMMARY

To address the issues in the related art, example implementations involve a framework that includes a group of tools and procedures. To facilitate systems that learn from previous training models and create models using the business requirements, example implementations described herein incorporate meta-learning and solves those resource gaps producing the analytics solution into products.

In example implementations, natural language processing (NLP) will be used to create a numeric representation of a hypothesis canvas (text) of an analytics solution core (ASC) and store it in the meta-learning database (DB) which stores the meta-pipelines (used in previous use cases) and which are composed of one or more meta-stage components that include a group of analytics applications and machine learning applications. Example implementations involve creating a database that can store all information about the modeling phase. In the data science cycle, the modeling phase is when the data scientist experiments with several different features and models to determine what model fits best to solve the problem. The database stores all these experiments and uses them in the future production of analytics, transforming previous experiments into future possible assets.

The main objective of this solution is to keep the models that could work in future analytics, thereby saving time and resources.

Further, in response to the new request for a solution, the NLP uses probabilistic search to find the likelihood of the different sequence of text by using the numerical representation of the pairs of words (e.g., low likelihood is a different group of words and high probability are similar group of words), and using a distance method to compute the similarity of the pairs in the meta-earning DB using input information.

The creation of the data science project requires data engineering, data science, and subject matter expertise. These three roles each make vital contributions to a data science project. The data scientist provides expertise in business, math, and coding; the subject matter expert contributes to the domain knowledge of the use case; and the data engineer supports data scientists and subject matter experts in the data engineering part of the project. Example implementations allow for the creation of a data science project encapsulating data scientist, subject matter expert, and domain expert knowledge in the system. Example implementations use the Hypothesis Business Canvas, an artifact that serves as input information with all the business requirements that are needed to build an analytical solution.

The composability of the analytics solution core solves the problem of a lack of reusability of the analytics artifacts. Nowadays, the analytics artifacts are not reused in an automatic procedure. A data scientist needs to design the analytical pipeline to reuse the stages. The analytics components are connected building an ASC. This ASC will be generated using components and the solution chooses the rights stages using the Hypothesis Canvas as the context of the analytics. For example, if the use case is a churn analysis and the user would like to use transaction information to run a churn analysis, then the data set for the transformation can include recency, frequency and monetization for the transactions data set which encodes categorical features to create a representation of the customer products. This representation will be the input for several machine learning algorithms to be trained.

In cases for which the appropriate solution core cannot be found, the closest meta-stages are selected from the DB, and the selected components are combined to be a new meta-pipeline ASC using a simulation process having the capability to learn new tasks and learn what is the best learning method. After learning the best method, the system will apply those methods in future models. All combinations of ASC will be stored in a meta-learning DB.

In related art implementations, data science projects threw away unused models after the data scientist chose a final model. The main purpose here is to store all the information from all models generated as a reference for future models. Retaining this information can be useful in new analytics experiments.

The example implementations described herein aim to provide an end-to-end solution for business users. The Hypothesis Business Canvas provides all the requirements needed for a data scientist to build a layer: the canvas connects to natural-language understanding (NLU) and a semantic matching layer that transforms the business use case in an analytics pipeline using the Analytics Solution Core proprieties like reusability and composability.

Aspects of the present disclosure involve a method for a system involving a plurality of sensors associated with a plurality of apparatuses, the method including, for receipt of a hypothesis canvas and meta-data from the plurality of sensors, generating a plurality of meta-pipeline stages, the plurality of meta-pipeline stages including the meta-data and one or more stages, each of the one or more stages being an analytics application or a machine learning application stacked in execution order based on the meta-data and the hypothesis canvas; and executing the plurality of meta-pipeline stages in execution order on the meta-data to generate an analytics model for the system.

Aspects of the present disclosure involve a computer program storing instructions for a system involving a plurality of sensors associated with a plurality of apparatuses, the instructions including, for receipt of a hypothesis canvas and meta-data from the plurality of sensors, generating a plurality of meta-pipeline stages, the plurality of meta-pipeline stages including the meta-data and one or more stages, each of the one or more stages being an analytics application or a machine learning application stacked in execution order based on the meta-data and the hypothesis canvas; and executing the plurality of meta-pipeline stages in execution order on the meta-data to generate an analytics model for the system. The computer program may be stored in a non-transitory computer readable medium and executed by one or more processors.

Aspects of the present disclosure involve a system involving a plurality of sensors associated with a plurality of apparatuses, and, for receipt of a hypothesis canvas and meta-data from the plurality of sensors, means for generating a plurality of meta-pipeline stages, the plurality of meta-pipeline stages including the meta-data and one or more stages, each of the one or more stages being an analytics application or a machine learning application stacked in execution order based on the meta-data and the hypothesis canvas; and means for executing the plurality of meta-pipeline stages in execution order on the meta-data to generate an analytics model for the system.

Aspects of the present disclosure involve a management apparatus for a system involving a plurality of sensors associated with a plurality of apparatuses, the management apparatus involving a processor, configured to, for receipt of a hypothesis canvas and meta-data from the plurality of sensors, generate a plurality of meta-pipeline stages, the plurality of meta-pipeline stages including the meta-data and one or more stages, each of the one or more stages being an analytics application or a machine learning application stacked in execution order based on the meta-data and the hypothesis canvas; and execute the plurality of meta-pipeline stages in execution order on the meta-data to generate an analytics model for the system

BRIEF DESCRIPTION OF DRAWINGS

FIG. 4 illustrates one example of the ASC Canvas from the ASC Continuous Anomaly Monitoring and Location Identification for Assets in Motion, in accordance with an example implementation.

FIG. 5 illustrates an example of a hypothesis canvas from continuous anomaly monitoring and location identification for assets in motion, in accordance with an example implementation.

DETAILED DESCRIPTION

Figure 1:
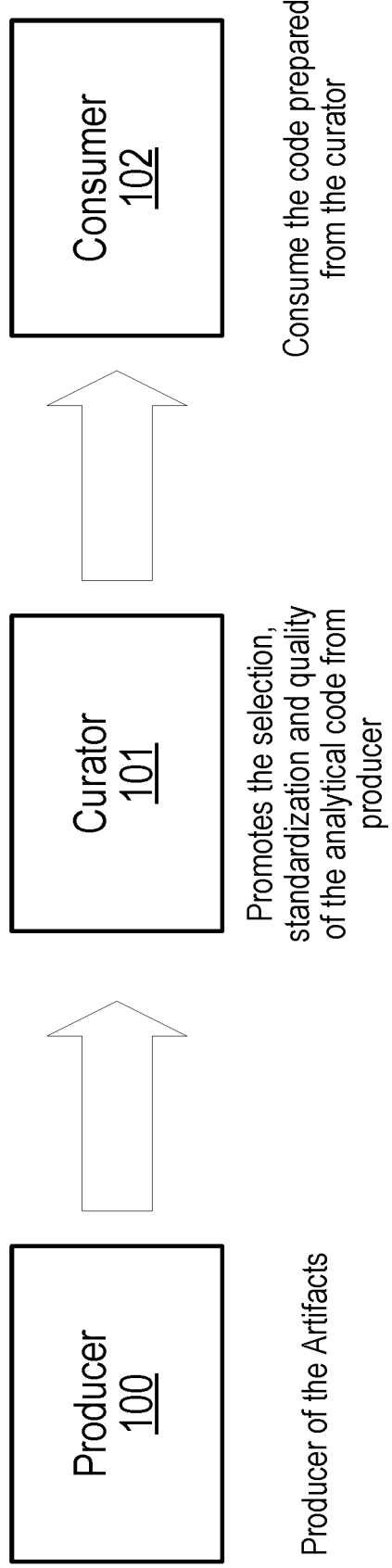
FIG. 1 illustrates an example regarding the various roles working together as the value chain for the ASC, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

An analytics code is born from customer engagement and shows its useful relevance from a market perspective. To explain the value chain around the Analytical Solution Core (ASC), there are three main personas involved: producer, curator and consumer. A producer includes those entities that create the analytical use case. They create the core artifacts and provide those artifacts to the curator. The curator are those entities who select, standardize, and improve the quality of the artifacts provided by the producer. The consumer, who is at the end of the value chain, includes those entities who consume the artifacts after the curator applies the transformation procedure.

FIG. 1 illustrates an example regarding the various roles working together as the value chain for the ASC, in accordance with an example implementation.

When analytical projects are required, they are placed in the system by producer 100 which involves the data science team that creates the business use case which includes the financial and legal profiles of the project, such as determining the need for nondisclosure agreements and intellectual propriety clauses. The data scientist team works to build the artifacts including the Hypothesis Canvas and analytical code among others. At the end of the project, several artifacts are ready for transformation in the ASC.

After the project closes, the data science team delivers the customer artifacts to the curator 101, which can involve the ASC team. The ASC team prepares the artifacts, adapts everything to the specifications and requirements of the ASC, controls the quality of the code, and improves the code as needed.

After the curating process, the artifacts are ready to be deployed for the consumer 102. The producer 100 may have several analytic engagements with customers. From these engagements, it is possible to test the ideas with experts in the domain, develop relevant analytical code, and transform it into an ASC. When transforming the code to an ASC, the first step for data scientists is to standardize the code. For this process, data scientists need to create artifacts such as python language, hypothesis canvas, original datasets, business documentation, technical documentation, hypothesis canvas template, and ASC canvas template.

Figure 2:
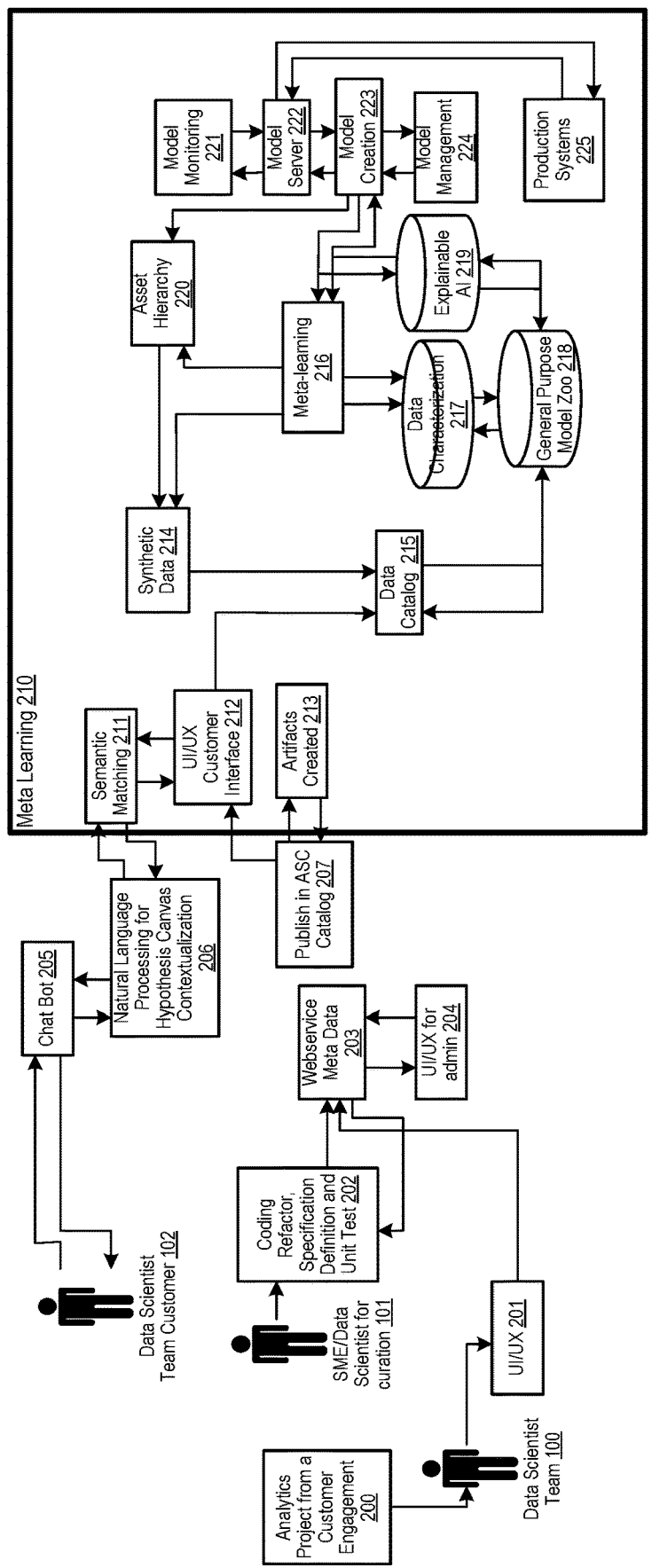
FIG. 2 illustrates an example architecture of the system, in accordance with an example implementation.

FIG. 2 illustrates an example architecture of the system, in accordance with an example implementation. Specifically, FIG. 2 illustrates how the subgroups join in a unified process flow to support the example implementations. As described in FIG. 1, producer 100 receives an analytics project from a customer engagement 200 which is input into a user interface 201. The curator 101 provides the coding refactor, specification definition, and unit test 202 to webservice meta data 203. The meta data 203 can be published in the ASC catalog 207 as artifacts 213 through the administrator user interface 204 of the meta learning system 210.

Consumer 102 communicates with the meta learning system 210 through chat bot 205. Chat bot 205 interfaces with a function facilitating natural language processing (NLP) for Hypothesis Canvas Contextualization 206 to facilitate communications between consumer 102 and meta learning system 210. Meta learning 210 conducts semantic matching 211 on the output of the NLP for hypothesis canvas contextualization 206 to provide to interface 212 so that data catalog 215 can be queried. Further explanation of the elements of meta learning 210 are provided below with respect to FIG. 7.

Figure 3:
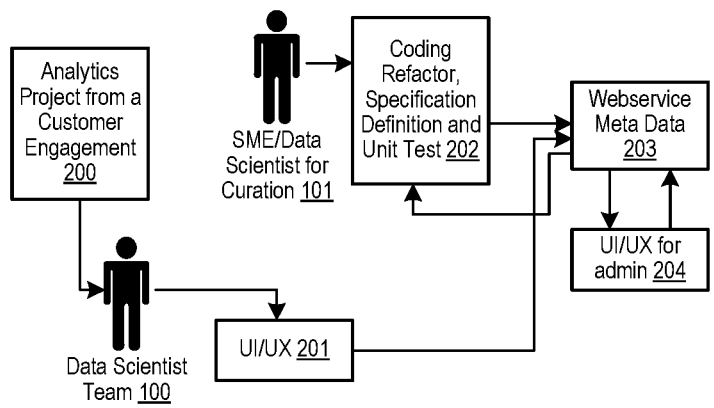
FIG. 3 illustrates an example of the data scientist curation flow to start the process, in accordance with an example implementation.

FIG. 3 illustrates an example of the data scientist curation flow to start the process, in accordance with an example implementation.

The data scientist receives artifacts 213 as "Analytics Project from a Customer Engagement". These artifacts 213 can include, but is not limited to, code in Python language, the hypothesis canvas, the original datasets, documentation with the explanation of the business part of the use case (to be processed in the hypothesis canvas template), documentation with the explanation of the technical part of the use case (to be processed in the ASC canvas template), and so on in accordance with the desired implementation.

With this documentation, the producer 100 submits all the packages into the code repository for the curator 101 to begin work using the UI/UX interface 204. The main objective for the curator 101 is to transform the code from a bunch of code snippets into a standardized and sequential logic to form the pipeline and stages. Then the curator 101 validates all the work previously performed by the producer 100. The curator 101 performs several major processes.

The first major process is referred to as the "Coding Refactor Specification Definition and Unit Test" group 202 which includes the following procedures:
1. Converting analytics code to the ASC standard for publication into ASC catalog 207.
2. Remove client data source systems dependency.
3. Include and verify test datasets.
4. Review and validate training data including training data preparation.
5. Perform quality assurance measures for the code.
6. Test the code for horizontal and vertical application.
7. Create the YML format for processing by YAML.

The second major process is focused on the documentation preparation for the ASC, which includes the following procedures:
1. Review the document of the ASC models.
2. Review the code comments and standards
3. Rewrite the code from python script format to the Jupyter Notebook format
4. Review the ASC Development Canvas.
5. Create the document of user journey integration.
6. Review the Hypothesis Development Canvas.
7. Create the ASC training document.
8. Review and validate the training data documentation.

The third major process is a group of procedures focused on the code enrichment group. This group includes ways to enrich the analytical code with additional features.
1. Enrich original analytical code by adding new features that improve the code performance for processing time and/or accuracy of the model.
2. Compliance and software license check and revision, if needed.

One of the main goals shown in FIG. 3 is to prepare the code and artifacts for future phases, including:
1. Creating YAML files: The data scientist team members of producer 100 will create the YAML file based on the specification of the tool. This YAML file will have all the guidelines needed by the application to run and execute the ASC.
2. Refactoring the Python code: As shown in FIG. 1, the data scientist team members of producer 100 convert the Python code into the ASC Python code standard.
3. The validation of Meta-data information for ASC: The validation of the meta-data information from the ASC is utilized by webservice meta data 203. With this information, it is possible to do a contextual search instead of a regular search in the database
4. Creating unit and integration tests: Unit test creation for testing the blocks, stages, and pipelines inside of ASC.

The three processes above and the meta-data information are the basic information for the webservice meta-data 203. Content is needed the following artifacts:
1. YAML files (pipeline and stage): a group of files in YAML format that has information about pipeline and stage.
2. Python files: Python files with the ASC code.
3. Use case meta-data: Information of the use case with the reference details about the ASC, such as type of industry, problems to solve, and machinery specifications that will be used. The ASC Canvas is discussed below.

The ASC and Hypothesis canvas are two artifacts that contains different meta-data regarding technical components of the runtime environment of the analytics and also contains information about the business use case. Both canvases will feed the natural language understanding (NLU) and NLP process giving to the system what it is the technical e-business context of the ASC.

FIG. 4 illustrates one example of the ASC Canvas from the ASC Continuous Anomaly Monitoring and Location Identification for Assets in Motion, in accordance with an example implementation.

In the example ASC canvas, there are various sections of content. Such section can include the following.

Model Description 401 provides a brief explanation of the model and its applicability. Algorithm Libraries 402 includes a list of the libraries and applications needed to run the ASC. Software and Hardware technology requirements 403 includes a list of resources needed to process and storage the data. Licensing Variables 404 include a list of licenses of the libraries. Potential Use Cases 405 includes a description of potential use cases that works with this model. Variables and Data Sources 406 include a list of variables and data sources needed to process the algorithm. Feature Engineering Requirements 407 include a list of features needed to process the raw data and feed the model with more meaningful information. Module Metrics/KPIs 408 include a list of metrics used to measure the performance of the model. Application Programming Interface (API) (Output) 409 includes a description of the outputs of the ASC. Operational comments 410 include additional comments that are important for the ASC.

In example implementations, the datasets used by ASC to train, test, and infer the model feature for the following elements. The data schema involves the definition of the dataset, including the description of each column, column name, type of variable, relationship between tables, and so on. The data content includes the content of the data.

FIG. 5 illustrates an example of a hypothesis canvas from continuous anomaly monitoring and location identification for assets in motion, in accordance with an example implementation. Specifically, the Hypothesis Canvas provides detailed information about the business data of the ASC.

To create the Hypothesis Canvas, the interface provides the following elements for input. Hypothesis 501 defines the hypothesis. Key performance indicators (KPIs) 502 defines the KPIs against which the hypothesis progress and success will be measured. Business value 503 defines the business value of the hypothesis. Stakeholders 504 indicates the constituents impacted by the hypothesis. Entities 505 defines the entities around which to build the analytics. Decisions 506 define the most important decisions in support of the hypothesis. Predictions 507 define the predictions that support the decisions.

Data source 508 defines the data sources to be used. Data source 508 can also define many points are required for the data source to support the hypothesis (e.g., 1 being the least valuable through 4 being the most valuable). Variables (Dimensions) 509 define the variables that might yield better predictors of performance. Recommendations 510 indicate the required recommendations to support the decisions. Impediments 511 includes the technical, data, and organizational impediments to success. Risks 512 indicate the costs or risks associated with false positives and false negatives. Financial Assessment 513 include the metrics in gains of the hypothesis and how many points the hypothesis is impacted by impediments (e.g., 1 being the least valuable through 4 being the most valuable). Impediment Assessment 514 includes the variable of the impediments assessment of the hypothesis and how many points the hypothesis is impacted by impediments (e.g., 1 being the least valuable through 4 being the most valuable).

Figure 6:
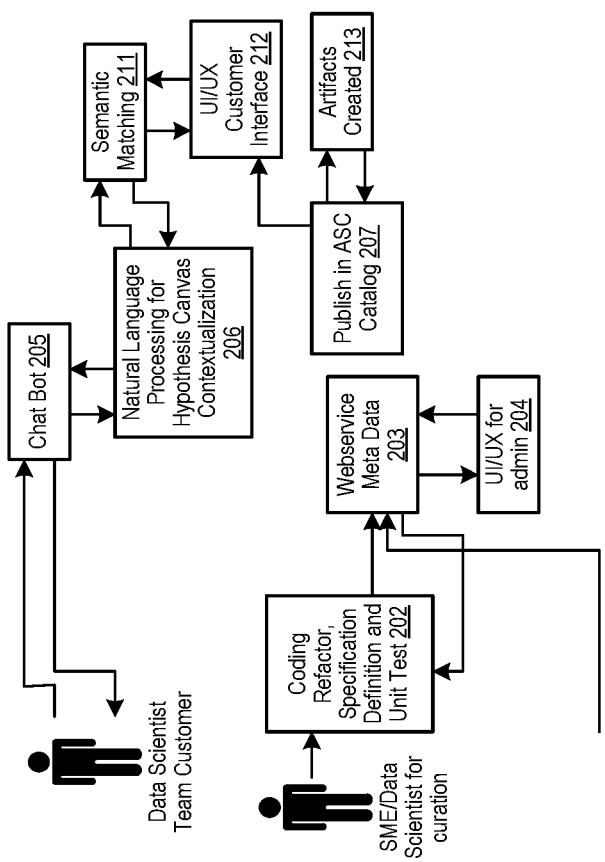
FIG. 6 illustrates an example of the system cognition, in accordance with an example implementation.

FIG. 6 illustrates an example of the system cognition, in accordance with an example implementation. The system of FIG. 6 is configured to determine, based on the Hypothesis Canvas, the context of the ASC that is demanded from the user. The user provides information to the NLP, NLU, and Semantic Matching process 206 via the chatbot 205, then the system translates what the user needs and searches on the database to determine whether there is an ASC that meets the user needs or if there exists a similar ASC. In the example implementations described herein, the queries as generated from the translation of the hypothesis canvas are used to retrieve or generate a meta-pipeline based on the query. The meta-pipeline is composed of meta-data that involves data from the underlying apparatuses of the system and one or more meta-stages that are configured to be executed sequentially on the meta-data with each of the meta-stages involving analytics applications or machine-learning applications.

Some of the components that are generated as part of system cognition include the following aspects. At first, the user exchanges information with the chatbot 205. Then, the natural-language processing algorithm 206 cleans up some "not" words from the user statements. The natural-language understanding model will then apply a classification model to recognize the user intentions in the conversation. The chatbot 205 captures this information and through using a rule-based algorithm, it will answer the user questions.

After several interactions, the semantic matching process 211 creates a fuzzy match related to identifying information that is semantically related, using graphing techniques, taxonomy, and ontology. and compares those representations with the databases of the hypothesis canvas that is stored in the Webservice meta-data 203. If the web service finds semantic matching, the ASC will be provided to the user from the artifacts creation 213 and General Purpose Model Zoo database 218. If it does not have any successful matches, the process will trigger the start of the meta-learning process 210 to create a new ASC using the meta-learning system 216.

Figure 7:
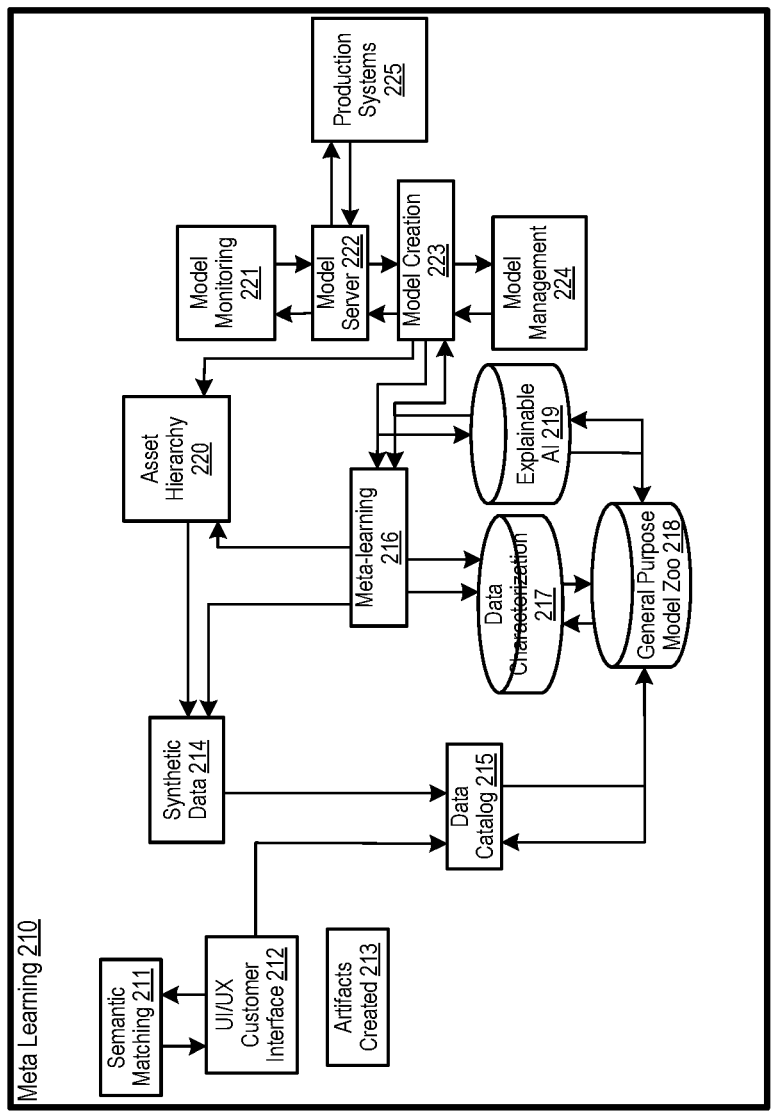
FIG. 7 illustrates an example of the meta-learning subsystem process, in accordance with an example implementation.

FIG. 7 illustrates an example of the meta-learning subsystem process 210, in accordance with an example implementation. After the system cognition tries to select the matching use case and the results are not successful, the meta-learning process 210 is invoked. The database will handle the storage of all predefined pipelines using ontology/taxonomy.

Figure 8:
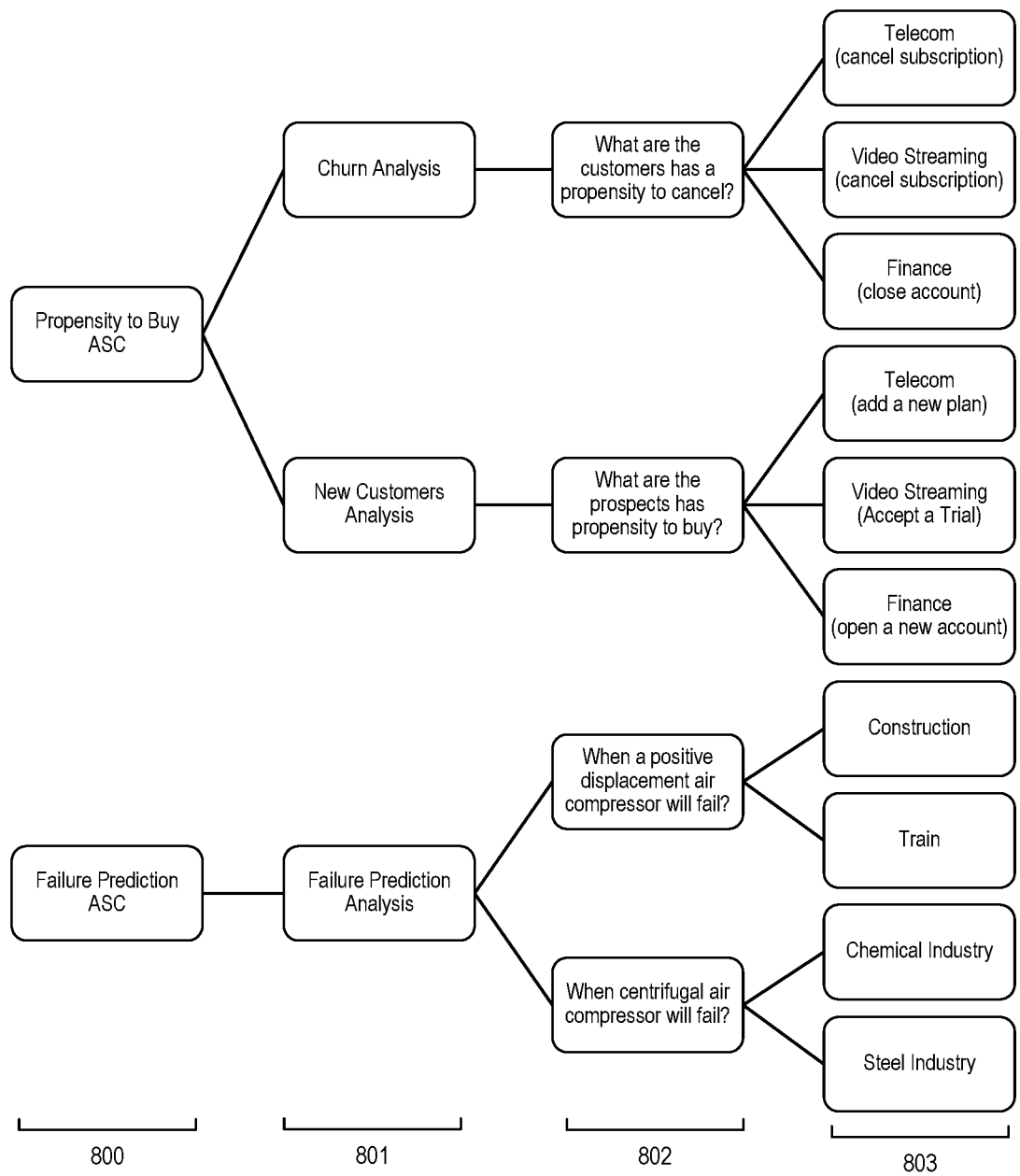
FIG. 8 illustrates an example of the taxonomy tree, in accordance with an example implementation.

FIG. 8 illustrates an example of the taxonomy tree 903, in accordance with an example implementation. The taxonomy tree will link the business perspective with the analytics. For example, it is possible to predefine the ASC to fit into the business problems needs on the taxonomy. The taxonomy tree 903 can contain various levels 800, 801, 802, 803 to traverse to link the business perspective with the analytics. Examples of the levels can include, but are not limited to, the ASC 800, the analytics 801, the problems 802, and the field 803 of the business.

In addition to the database, it has prebuilt procedures of Explainable artificial intelligence (AI) 219 to sustain the process and explain the results to the users. This Explainable AI 219 capability also contains the taxonomy tree includes the best explainable feature for the use case. The process is coordinated by the Model Management process in the following flow for every asset in the asset hierarchy.

At first, the Model Manager 224 starts the process by using the ASC based on business user input and using the taxonomy and the asset in the asset model. The model manager will look for the most similar ASC.

Then, the model manager identifies the data on the data catalog 215 using the predefined taxonomy. If needed, it will fill missing values or prepare synthetic data 214 based on current sampling. For the sampling method, from using the current sample, the model manager 224 will reproduce new data using the distribution of the data and see which distribution represents the sample dataset. After this step, it runs a Monte Carlo simulation to generate a random sample with the same distribution. The data catalog 215 and synthesized data process 214 is invoked for every asset in the asset hierarchy 220.

Figure 9:
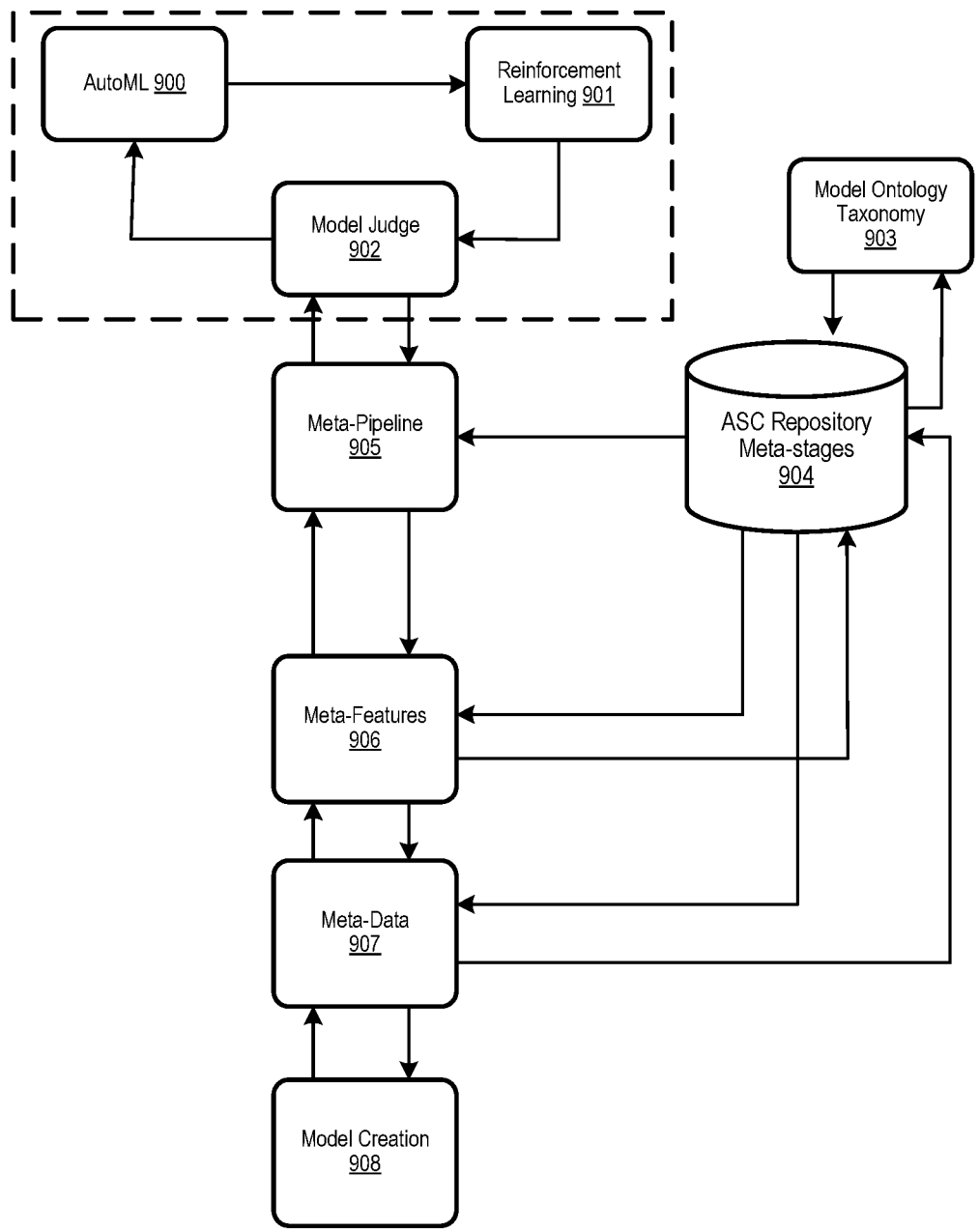
FIG. 9 illustrates an example of the meta-learning process, in accordance with an example implementation.

If a similar ASC is not found, the model manager 224 goes through the process of constructing an ASC from the meta-learning process, which is described with respect to FIG. 9.

Based on pre-existing ASC or based on a new ASC, the ASC is deployed using the model server 222 which can execute the model on production systems 225. The model monitoring 221 then monitors the model drift and starts a new training phase using new data. If the training phase does not obtain sufficient results, the procedure starts the meta-learning process 216 and data characterization process 217 for discovering a new model. If the meta-learning process is not successful, the overall solution will require the data scientist to fine-tune to move forward. The process repeats for each asset on the asset hierarchy and will be done in parallel for optimal performance for all assets.

FIG. 9 illustrates an example of the meta-learning process, in accordance with an example implementation.

In the model deployment phase, the model is generated from execution of the meta-stages that form the meta-pipeline 905 and model creation 908. The model is deployed by AutoML library 900 and trained by using reinforcement learning 901 as further described in FIG. 10. The model is evaluated against KPIs through model judge 902. If the model needs to be recreated, then feedback can be provided to meta-pipeline 905 to modify the meta-stages and create a new model through model creation 908.

During the model training step, the meta-learning process of FIG. 9 is used to achieve a different ASC method in the case that it does not exist. The meta-learning phases are defined as follows.

At first, by using taxonomy 903, the process traverses meta-stages repository 904 and selects predefined meta-pipelines 905, meta-data 907, and meta-features 906. The meta-learning concept is the process by which automatic learning from the previous machine learning models is reused and learned in future models. Meta-stages are the atom component of analytics that are used previously in other use cases and can be useful for future use cases of the same nature. Such meta-stages can be stored in meta-stages repository 904. Meta-pipelines 905 are analytical pipelines composed by meta-stages that are used previously in other use cases and it can be useful for future use cases of the same nature.

Figure 10:
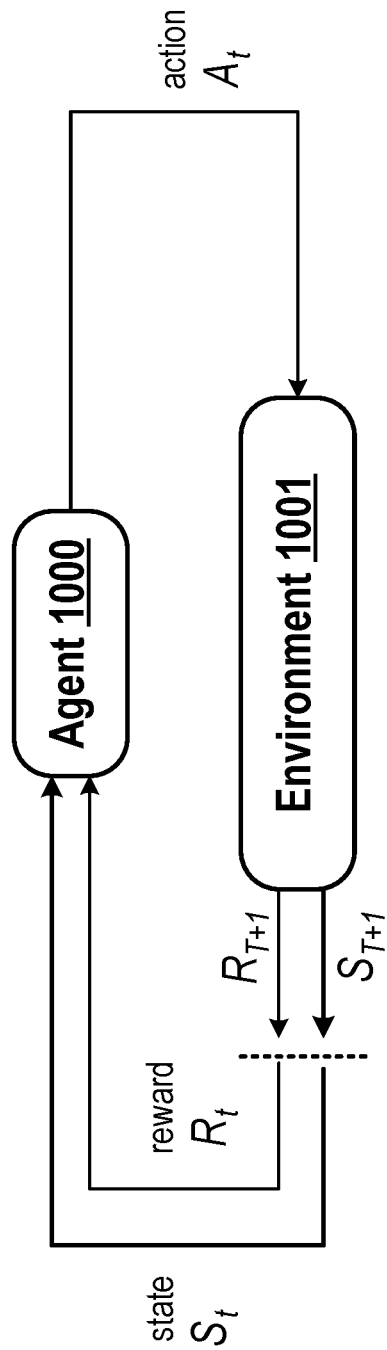
FIG. 10 illustrates a reinforcement learning (RL) process, in accordance with an example implementation.

FIG. 10 illustrates a reinforcement learning (RL) process, in accordance with an example implementation. The input of the RL process is several potential models that will use the meta-data, meta-features, and meta-pipelines as defined previously to create several different scenarios.

The first round of RL is the exploration phase where the best model will be selected based on the action and maximize the reward system and minimize the regret that consists of the multi-armed bandit approach. Each model will be named as an agent 1000. The objective is to maximize the score of the instances and maximize the performance metrics. The actions are the selection of different hyperparameters in the model using a hyperparameter policy. The agent 1000 that collects the best reward is deployed on the production by the model management. This is the exploitation of the agent. On the production environment 1001, model management measures the health state and monitors the agent behavior. If the reward of the agent is not the optimal one, the model management removes the current agent from production and selects a second agent to be exploited. This process is repeated until the process exhausts all the agents 1000.

Figure 11:
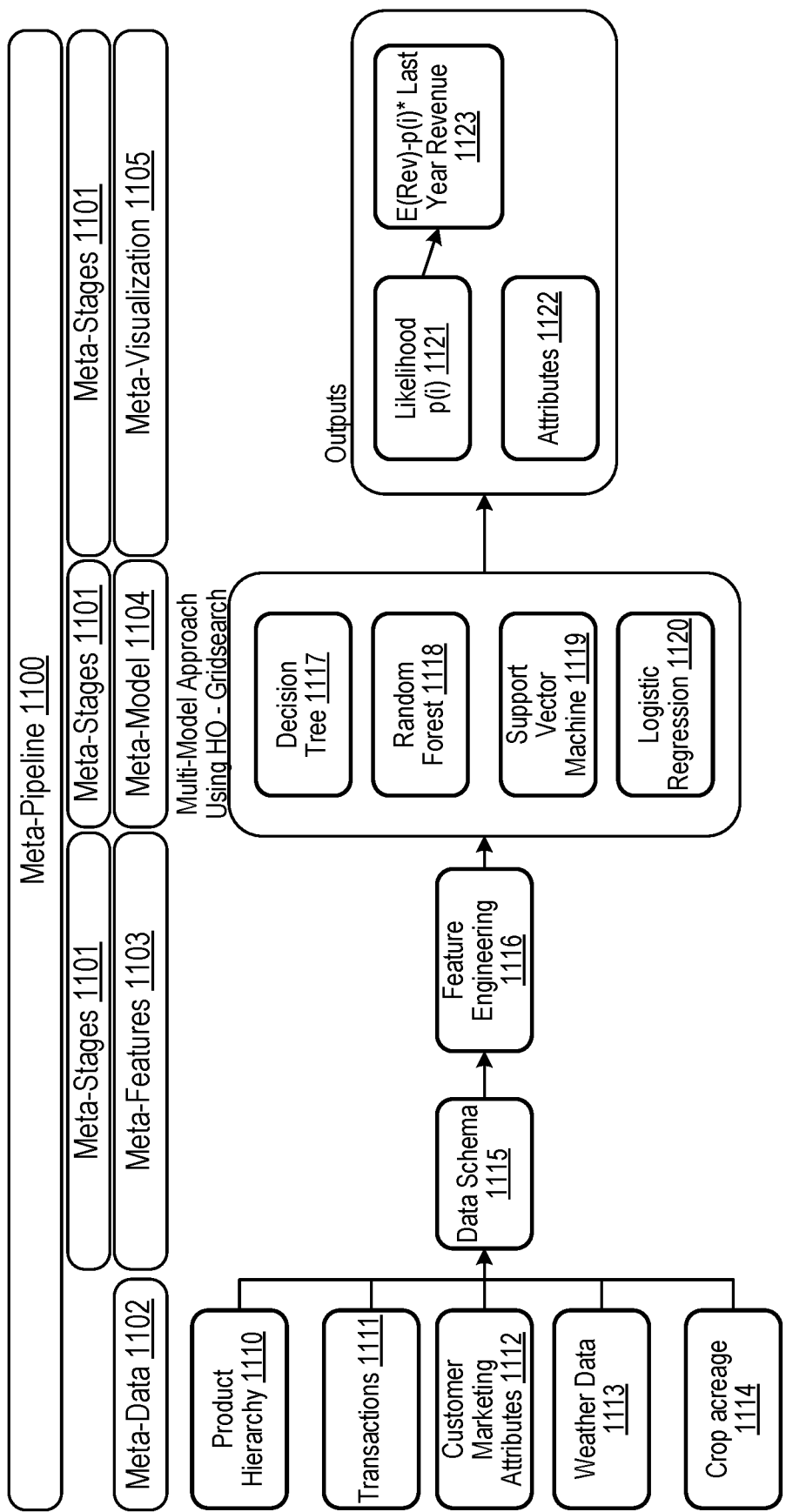
FIG. 11 illustrates an example a meta-pipeline, in accordance with an example implementation.

FIG. 11 illustrates an example a meta-pipeline 1100, in accordance with an example implementation. A meta-pipeline 1100 involves meta-data 1102 processed by different meta-stages 1101 that can be composed in different ways. Each of these meta-stages 1101 can be evaluated and compared with the meta-data from the customer to determine which of the meta-stages 1101 or combinations thereof have the best performance.

Meta-stages 1101 can involve different analytics applications (e.g., statistical applications, visualization applications, etc.) and/or machine learning applications that are applied and executed sequentially. For example, meta-stages 1101 can involve units of statistics, analytics, data information, or machine learning models that can be used to create the meta-pipeline 1100 and interconnected in execution order. Examples of meta-stages 1101 can include, but are not limited to, meta-features 1103, meta-models 1104, and meta-visualization application 1105.

In the following example of meta-pipeline 1100, meta-data 1102 can involve, but is not limited to, product hierarchy 1110, transactions 1111, customer marketing attributes 1112, weather data 1113, and crop acreage 1114. Meta-data 1102 is linked to the first meta-stage, which is meta-features 1103. The meta-features 1103 involves an application that generates features from the meta-data 1102. Examples of sub-functions used by meta-features 1103 to generate features from the meta-data 1102 can involve the data schema 1115 to format the meta-data into a preferred structure and feature engineering 1116 to derive the features from the processed meta-data. The meta-features 1103 meta-stage is then linked to the next meta-stage which is meta-model 1104.

Meta-model 1104 is configured to intake features generated from meta-features 1103 to generate a model. In this example, meta-model 1104 involves a multi-model approach through using grid-search to identify the best fit model formed from a combination of models. Such models for the gridsearch, random search or Bayesian optimization can involve, but are not limited to, decision tree 1117, random forest 1118, support vector machine 1119, and logistic regression 1120.

Meta-model 1104 is then linked into the next meta-stage, which is meta-visualization application 1105. The model generated by meta-model 1104 is then connected to a meta-visualization application 1105, which produces output for visualizing the analytics. Examples of output from the visualization application 1105 can involve likelihood p(i) 1121, attributes 1122, and E(Rev)−p(i)*Last Year Revenue 1123.

Thus, in the example meta-pipeline 1100, meta-data 1102 is processed through meta-stages 1101 in execution order, which involves the execution of meta-features 1103 to process the meta-data 1102 to extract features, then the execution of meta-model 1104 to intake features from meta-feature 1103 to generate a model, and then the execution of meta-visualization 1105 to generate visualization output. In another example implementation, another example of meta-stages 1101 can involve a controller application that controls the underlying apparatuses of the system based on the output of the meta-model 1104.

Through the example implementations described herein, deployment in a large scale system (e.g., analytics factory, production line, etc.) can allow the models to control the system while being updated in real time. In an example, through the hypothesis canvas and the meta-data, including the analytical code and the business artifacts, the output can be the analytics system with models that can be deployed in a SaaS service format.

The example implementation described herein can facilitate a data warehouse of models, making it easier for data scientists to check and reuse any model for a given solution. By retaining the models that produced "bad" results, data scientists can check and review those areas that performed poorly. For the models that performed well, data scientists can keep those models and reuse them, retraining or not retraining them with different data.

Figure 12:
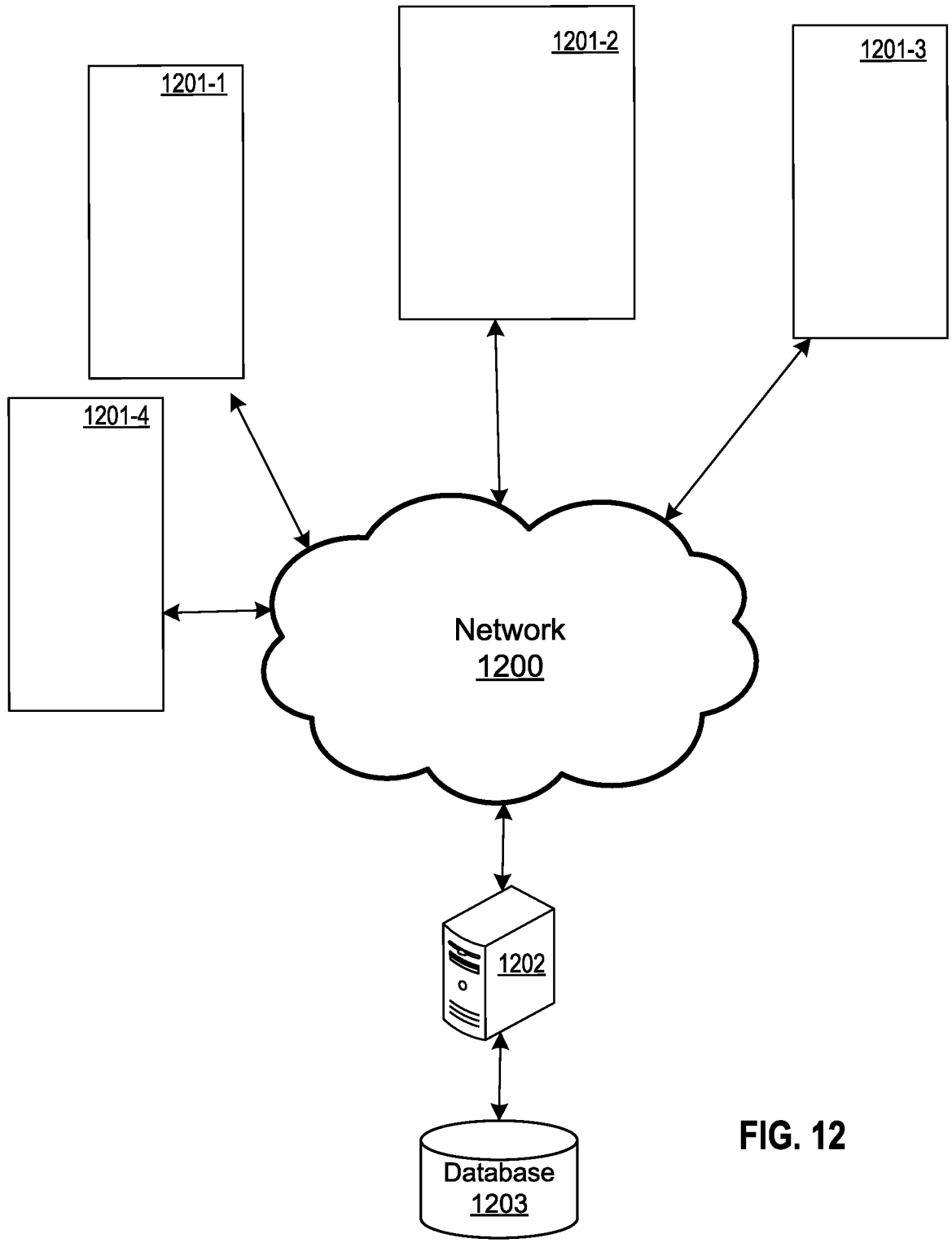
FIG. 12 illustrates a system involving a plurality of systems with connected sensors and a management apparatus, in accordance with an example implementation.

FIG. 12 illustrates a system involving a plurality of systems with connected sensors and a management apparatus, in accordance with an example implementation. One or more systems with connected sensors 1201-1, 1201-2, 1201-3, and 1201-4 are communicatively coupled to a network 1200 which is connected to a management apparatus 1202, which facilitates functionality for an Internet of Things (IoT) gateway or other manufacturing management system. The management apparatus 1202 manages a database 1203, which contains historical data collected from the sensors of the systems 1201-1, 1201-2, 1201-3, and 1201-4, which can include labeled data and unlabeled data as received from the systems 1201-1, 1201-2, 1201-3, and 1201-4. In alternate example implementations, the data from the sensors of the systems 1201-1, 1201-2, 1201-3, 1201-4 can be stored to a central repository or central database such as proprietary databases that intake data such as enterprise resource planning systems, and the management apparatus 1202 can access or retrieve the data from the central repository or central database. Such systems can include robot arms with sensors, turbines with sensors, lathes with sensors, and so on in accordance with the desired implementation.

Figure 13:
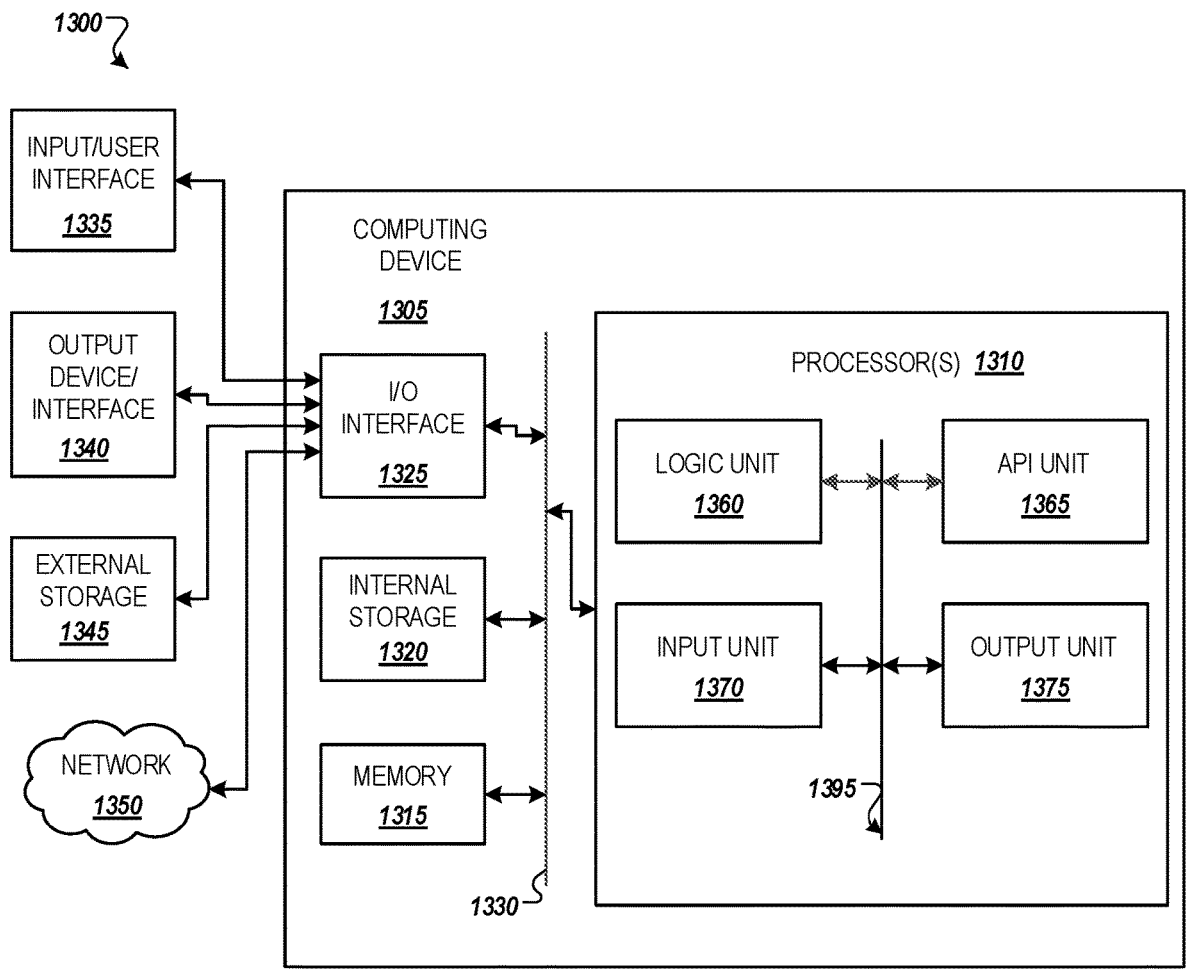
FIG. 13 illustrates an example computing environment with an example computer device suitable for use in some example implementations.

FIG. 13 illustrates an example computing environment with an example computer device suitable for use in some example implementations, such as a management apparatus 1202 as illustrated in FIG. 12.

Computer device 1305 in computing environment 1300 can include one or more processing units, cores, or processors 1310, memory 1315 (e.g., RAM, ROM, and/or the like), internal storage 1320 (e.g., magnetic, optical, solid state storage, and/or organic), and/or I/O interface 1325, any of which can be coupled on a communication mechanism or bus 1330 for communicating information or embedded in the computer device 1305. I/O interface 1325 is also configured to receive images from cameras or provide images to projectors or displays, depending on the desired implementation.

Computer device 1305 can be communicatively coupled to input/user interface 1335 and output device/interface 1340. Either one or both of input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via I/O interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

I/O interface 1325 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1310 can execute under any operating system (OS) (not shown), in a native or virtual environment. One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, input unit 1370, output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide output based on the calculations described in example implementations.

For receipt of a hypothesis canvas as illustrated in FIG. 5 and meta-data from the plurality of sensors, processor(s)

1310 can be configured to generate a plurality of meta-pipeline stages, the plurality of meta-pipeline stages including the meta-data and one or more stages, each of the one or more stages being an analytics application or a machine learning application stacked in execution order based on the meta-data and the hypothesis canvas as illustrated in FIG. 11; and execute the plurality of meta-pipeline stages in execution order on the meta-data to generate an analytics model for the system as illustrated in FIG. 9.

Processor(s) 1310 can be configured to execute a reinforcement learning process to select ones of the generated plurality of meta-pipeline stages for execution on the meta-data as illustrated in FIG. 10.

Processor(s) 1310 can be configured to generate the plurality of meta-pipeline stages by translating the hypothesis canvas to generate queries for a semantic search through the use of natural language processing; executing a semantic search on a meta-learning database from the queries to search for one or more pipelines relevant to the plurality of apparatuses; generating the meta-pipeline stages from the one or more pipelines; and managing the meta-pipeline stages in a repository configured to track learned models generated from the meta-pipeline stages, meta-data associated with the learned models, and meta-features associated in the learned models as illustrated in FIGS. 3 and 6.

Processor(s) 1310 can be configured to evaluate the analytics model against one or more key performance indicators extracted from the hypothesis canvas; and modifying one or more of the plurality of the meta-pipeline stages based on the evaluation as illustrated in FIGS. 9 and 10.

As illustrated in FIGS. 7-11, processor(s) 1310 can be configured to execute the plurality of meta-pipeline stages in execution order on the meta-data to generate the analytics model for the system comprises generating a plurality of candidate analytics models with varying hyperparameters selected from a hyperparameter policy, and wherein the evaluating the analytics model against one or more key performance indicators extracted from the hypothesis canvas involves evaluating the plurality of candidate analytics models against sensor data received from the plurality of sensors processed through the plurality of candidate analytics models through a multi-armed bandit approach; wherein the modifying one or more of the plurality of the meta-pipeline stages based on the evaluation further involves selecting one of the candidate analytics models maximizing a collected reward through the multi-armed bandit approach as the analytics model; and modifying the one or more of the plurality of pipeline stages according to the selected one of the candidate analytics models.

As illustrated in FIG. 5, the hypothesis canvas can involve a plurality of data sources identifying ones of the plurality of sensors to obtain the meta-data, a hypothesis associated with the system, predictions expected from the hypothesis, and risks associated with the hypothesis.

As illustrated in FIG. 9, the processor(s) 1310 can be configured to execute a meta-learning process configured to compare data structures from different meta-data and meta-features, and from existing datasets and new datasets, and from different datasets to apply a meta-pipeline on the new datasets.

Processor(s) 1310 can be configured to control the one or more of the plurality of apparatuses through deployment of the analytics model on the system. For example, the processor(s) 1310 can be configured to, base on the output of the analytics model, power on/off an apparatus, activate an and on near the apparatus to flag a foreman, adjust settings of the apparatus in real time, and so on in accordance with the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software.

Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a system comprising a plurality of sensors associated with a plurality of apparatuses, the method comprising, for receipt of a hypothesis canvas and meta-data from the plurality of sensors:
   generating a plurality of meta-pipeline stages, the plurality of meta-pipeline stages comprising the meta-data and one or more stages, each of the one or more stages being an analytics application or a machine learning application stacked in execution order based on the meta-data and the hypothesis canvas; and
   executing the plurality of meta-pipeline stages in execution order on the meta-data to generate an analytics model for the system.

2. The method of claim 1, further comprising executing a reinforcement learning process to select ones of the generated plurality of meta-pipeline stages for execution on the meta-data.

3. The method of claim 1, wherein the generating the plurality of meta-pipeline stages comprises:
   translating the hypothesis canvas to generate queries for a semantic search through the use of natural language processing;
   executing a semantic search on a meta-learning database from the queries to search for one or more pipelines relevant to the plurality of apparatuses;
   generating the meta-pipeline stages from the one or more pipelines;
   managing the meta-pipeline stages in a repository configured to track learned models generated from the meta-pipeline stages, meta-data associated with the learned models, and meta-features associated in the learned models.

4. The method of claim 1, further comprising:
   evaluating the analytics model against one or more key performance indicators extracted from the hypothesis canvas;
   modifying one or more of the plurality of the meta-pipeline stages based on the evaluation.

5. The method of claim 4, wherein the executing the plurality of meta-pipeline stages in execution order on the meta-data to generate the analytics model for the system comprises generating a plurality of candidate analytics models with varying hyperparameters selected from a hyperparameter policy, and
   wherein the evaluating the analytics model against one or more key performance indicators extracted from the hypothesis canvas comprises evaluating the plurality of candidate analytics models against sensor data received from the plurality of sensors processed through the plurality of candidate analytics models through a multi-armed bandit approach;
   wherein the modifying one or more of the plurality of the meta-pipeline stages based on the evaluation comprises:
   selecting one of the candidate analytics models maximizing a collected reward through the multi-armed bandit approach as the analytics model; and
   modifying the one or more of the plurality of pipeline stages according to the selected one of the candidate analytics models.

6. The method of claim 1, further comprising controlling one or more of the plurality of apparatuses through deployment of the analytics model on the system.

7. The method of claim 1, wherein the hypothesis canvas comprises a plurality of data sources identifying ones of the plurality of sensors to obtain the meta-data, a hypothesis associated with the system, predictions expected from the hypothesis, and risks associated with the hypothesis.

8. The method of claim 1, further comprising executing a meta-learning process configured to compare data structures from different meta-data and meta-features, and from existing datasets and new datasets, and from different datasets to apply a meta-pipeline on the new datasets.

9. A non-transitory computer readable medium, storing instructions for a system comprising a plurality of sensors associated with a plurality of apparatuses, the instructions comprising, for receipt of a hypothesis canvas and meta-data from the plurality of sensors:
   generating a plurality of meta-pipeline stages, the plurality of meta-pipeline stages comprising the meta-data and one or more stages, each of the one or more stages being an analytics application or a machine learning application stacked in execution order based on the meta-data and the hypothesis canvas; and
   executing the plurality of meta-pipeline stages in execution order on the meta-data to generate an analytics model for the system.

10. The non-transitory computer readable medium of claim 9, the instructions further comprising executing a reinforcement learning process to select ones of the generated plurality of meta-pipeline stages for execution on the meta-data.

11. The non-transitory computer readable medium of claim 9, wherein the generating the plurality of meta-pipeline stages comprises:
    translating the hypothesis canvas to generate queries for a semantic search through the use of natural language processing;
    executing a semantic search on a meta-learning database from the queries to search for one or more pipelines relevant to the plurality of apparatuses;
    generating the meta-pipeline stages from the one or more pipelines;
    managing the meta-pipeline stages in a repository configured to track learned models generated from the meta-pipeline stages, meta-data associated with the learned models, and meta-features associated in the learned models.

12. The non-transitory computer readable medium of claim 9, the instructions further comprising:
    evaluating the analytics model against one or more key performance indicators extracted from the hypothesis canvas;
    modifying one or more of the plurality of the meta-pipeline stages based on the evaluation.

13. The non-transitory computer readable medium of claim 9, wherein the executing the plurality of meta-pipeline stages in execution order on the meta-data to generate the analytics model for the system comprises generating a plurality of candidate analytics models with varying hyperparameters selected from a hyperparameter policy, and
   wherein the evaluating the analytics model against one or more key performance indicators extracted from the hypothesis canvas comprises evaluating the plurality of candidate analytics models against sensor data received from the plurality of sensors processed through the plurality of candidate analytics models through a multi-armed bandit approach;
   wherein the modifying one or more of the plurality of the meta-pipeline stages based on the evaluation comprises:
      selecting one of the candidate analytics models maximizing a collected reward through the multi-armed bandit approach as the analytics model; and
      modifying the one or more of the plurality of pipeline stages according to the selected one of the candidate analytics models.

14. The non-transitory computer readable medium of claim 9, the instructions further comprising controlling one or more of the plurality of apparatuses through deployment of the analytics model on the system.

15. The non-transitory computer readable medium of claim 9, wherein the hypothesis canvas comprises a plurality of data sources identifying ones of the plurality of sensors to obtain the meta-data, a hypothesis associated with the system, predictions expected from the hypothesis, and risks associated with the hypothesis.

16. The non-transitory computer readable medium of claim 9, the instructions further comprising executing a meta-learning process configured to compare data structures from different meta-data and meta-features, and from existing datasets and new datasets, and from different datasets to apply a meta-pipeline on the new datasets.

* * * * *